US011565679B2

(12) United States Patent
Franczuk et al.

(10) Patent No.: US 11,565,679 B2
(45) Date of Patent: Jan. 31, 2023

(54) SPRING BRAKE ACTUATOR AND BRAKE RELEASE MECHANISM THEREFOR

(71) Applicant: WABCO Europe BVBA, Brussels (BE)

(72) Inventors: Michal Franczuk, Brzeg (PL); Lukasz Szczuplak, Dlugoleka (PL)

(73) Assignee: WABCO Europe BVBA, Brussels (BE)

( * ) Notice: Subject to any disclaimer, the term of this patent is extended or adjusted under 35 U.S.C. 154(b) by 303 days.

(21) Appl. No.: 16/904,668

(22) Filed: Jun. 18, 2020

(65) Prior Publication Data

US 2020/0398808 A1 Dec. 24, 2020

(30) Foreign Application Priority Data

Jun. 20, 2019 (EP) ...................... 19181448

(51) Int. Cl.
*B60T 17/08* (2006.01)
*F16D 65/28* (2006.01)

(52) U.S. Cl.
CPC .......... *B60T 17/086* (2013.01); *B60T 17/083* (2013.01); *F16D 65/28* (2013.01)

(58) Field of Classification Search
CPC ...... B60T 17/083; B60T 15/041; B60T 17/18; F16D 66/025; F16D 66/026; F16D 66/028; F16D 66/00; G01L 5/0061
See application file for complete search history.

(56) References Cited

U.S. PATENT DOCUMENTS

| 3,717,072 | A | * | 2/1973 | Kaltenthaler | ......... B60T 17/085 92/152 |
| 5,623,863 | A | * | 4/1997 | Plantan | ................. B60T 17/086 92/63 |
| 5,632,192 | A | * | 5/1997 | Plantan | ................. B60T 17/086 92/5 L |
| 5,943,940 | A | | 8/1999 | Angerfors | |
| 7,963,210 | B2 | * | 6/2011 | Lanquetot | ............. B60T 17/086 91/363 R |

(Continued)

FOREIGN PATENT DOCUMENTS

| CN | 107956825 A | * | 4/2018 |
| DE | 102007041769 A1 | | 3/2009 |

(Continued)

*Primary Examiner* — Robert A. Siconolfi
*Assistant Examiner* — Mahbubur Rashid
(74) *Attorney, Agent, or Firm* — Dickinson Wright PLLC

(57) ABSTRACT

A brake release mechanism for a spring brake actuator includes a brake release bolt having a threaded portion, a running engaging the threaded portion, the running nut being adapted to axially travel along the threaded portion in order to move a spring brake actuator piston against a force of an actuator power spring, an indicator device comprising an indicator pin being at least partially accommodated in a receiving space of the release bolt, wherein the indicator device further comprises a pin actuator for axially moving the pin relative to the receiving space. It is proposed according to the invention that the pin actuator comprises an indicator cap being attached to the pin, the indicator cap comprising a basic body and at least one spacing element being attached to the basic body, the spacing element being configured to abut against the running nut.

20 Claims, 6 Drawing Sheets

(56) References Cited

U.S. PATENT DOCUMENTS

| | | | | |
|---|---|---|---|---|
| 9,028,012 B2* | 5/2015 | Iraschko | ............... | B60T 17/083 |
| | | | | 188/1.11 R |
| 9,238,455 B2* | 1/2016 | Park | ................ | B60T 17/086 |
| 9,487,203 B2* | 11/2016 | Park | ................ | B60T 17/083 |
| 2004/0060784 A1* | 4/2004 | Gravier | ................ | B60T 17/086 |
| | | | | 188/170 |
| 2013/0146404 A1* | 6/2013 | Iraschko | ............... | B60T 17/083 |
| | | | | 188/106 F |

FOREIGN PATENT DOCUMENTS

| | | | | |
|---|---|---|---|---|
| DE | 19630795 B4 * | 3/2014 | ............ | B60T 17/086 |
| EP | 2197720 B1 * | 3/2016 | ............ | B60T 17/086 |
| JP | H11511091 A * | 9/1999 | | |
| JP | 2000501159 A * | 2/2000 | | |
| WO | WO-9605093 A1 * | 2/1996 | ............ | B60T 17/083 |
| WO | 97/07322 A1 | 2/1997 | | |
| WO | WO-9720153 A1 * | 6/1997 | ............ | B60T 17/085 |

* cited by examiner

SPRING BRAKE ACTUATOR AND BRAKE RELEASE MECHANISM THEREFOR

TECHNICAL FIELD

The invention relates to a brake release mechanism for a spring brake actuator, in particular a parking or emergency spring brake actuator for use in a commercial vehicle, the release mechanism comprising: a brake release bolt having a threaded portion, a running nut engaging the threaded portion, the running nut being adapted to axially travel along the threaded portion in order to move a spring brake actuator piston against a force of an actuator power spring and an indicator device comprising an indicator pin being at least partially accommodated in a receiving space of the brake release bolt, wherein the indicator device further comprises a pin actuator for axially moving the pin relative to the receiving space.

BACKGROUND

Brake release mechanisms for spring brake actuators are generally known in the prior art. It is the aim of such release mechanisms to release a spring brake actuator for example in case of pneumatic system malfunctions. In known brake release mechanisms, the actuator is released by rotating a brake release bolt. Such release bolts comprise a threaded portion on which a running nut is engaged. The running nut is allowed to only move axially within a release bolt housing. Thus, rotating the release bolt leads to an axial movement of the running nut. The axial movement on the running nut is then utilized to move a spring brake actuator piston against a force of the actuator power spring to finally release the spring brake actuator and the wheel brake as such. It is furthermore known that brake release mechanisms comprise an indicator device having an indicator pin which is at least partially accommodated in a receiving space of the release bolt. The indicator pin is movable axially with respect to the release bolt receiving space. Based on the position of the indicator pin, an operator is able to determine whether the brake release mechanism is in a released state at which the spring brake actuator is released or in a driving state at which the release mechanism does not act upon the actuator piston and the power spring.

Although these systems are well-proven, there is still room for improvement. One of the drawbacks of the state of the art systems is that they require a considerable amount of additional installation space contravening the market demand for compact spring brake actuators. Additionally, technologically advanced spring brake actuators regularly comprise internal breathing valves which are used to guide dry and clean air to a spring room of such a spring brake actuator. These valves are typically arranged closely to the brake release mechanism and require additional space as well. Hence, the use of advanced technologies in spring brake actuators, such as indicator bolts and internal breathing valves, generally increases the dimensions of such a spring brake actuator, which may be of disadvantage in environments in which the given installation space for such actuators is limited.

SUMMARY

The present disclosure provides a brake release mechanism for a spring brake actuator that overcomes at least some of the above-mentioned issues. In particular, the proposed brake release mechanism offers means to indicate the state of the brake release mechanism while at the same time reducing the required installation space for the brake release mechanism.

According to the invention, a pin actuator is proposed which comprises an indicator cap being attached to the pin, the indicator cap comprising a basic body and at least one spacing element being attached to the basic body, the spring element being configured to abut against the running nut (claim 1). The invention is based on the finding that such an indicator cap design offers a number of advantages. The proposed indicator cap ensures that the pin is actuated depending on the position of the running nut, which allows for an indication regarding the state of the brake release mechanism while the proposed solution is also compact regarding the required installation space. Compared to known solutions, such an indicator cap design allows for reduced release mechanism diameters.

According to another embodiment, the indicator cap comprises 2-7 spacing elements, preferably 3 spacing elements. The spacing elements that are attached to the basic body of the indicator cap allow for a reduced required installation space while at the same time it is ensured that the required force to actuate the indicator pin is transferred from the running nut to the pin uniformly. A potential tilting of the pin actuator is avoided. Furthermore, this solution saves weight and material.

According to a preferred embodiment, the spacing elements are equally spaced around the circumference of the basic body. This also helps to avoid tilting and to ensure that the actuating force for the indicator pin is transferred uniformly from the running nut to the indicator pin.

Preferably, the bolt comprises a spring element forcing the indicator pin toward a first direction and a locking piece being attached to the bolt, the actuator being configured to abut against the locking piece to limit a motion distance of the pin in the first direction. Based on the interaction of the pin actuator with the locking piece, the motion distance of the pin in the first direction can be limited and selected as required. For example, for certain brake release mechanisms it may be beneficial to have the pin move a greater motion distance to ensure that the state of the brake release mechanism is properly perceptible. For other applications, for example, in which the actuator installation space is limited, a more compact solution may be preferred at which the motion distance of the pin is limited to the extent required to safely determine the state of the brake release mechanism.

According to yet another embodiment, the basic body and/or the locking piece comprise guiding means to axially and/or radially guide the indicator cap relative to the locking piece. This also helps to ensure a smooth operation of the release mechanism while avoiding a tilting of the pin actuator.

It is furthermore preferred that the locking piece comprises at least one aperture for accommodating and guiding the spacing elements of the indicator cap. Such apertures for accommodating and guiding the spacing elements of the indicator cap ensure a proper guidance of the indicator cap while at the same time allowing for a compact design of the pin indicator itself.

According to an alternative embodiment, the locking piece comprises centering protrusions configured to extend into gaps between the spacing elements at least partially, for guiding and centering the indicator cap. According to this solution, the spacing elements are not guided by apertures in the locking piece, but with respect to centering protrusions that are attached to the locking piece. These centering protrusions extend into gaps between the spacing elements to provide a guidance and centering of the indicator cap.

According to yet another alternative embodiment, the spacing element is formed as a sleeve. This reduces the manufacturing complexity of the indicator cap.

It is furthermore preferred that the pin and the indicator cap are press-fittingly attached to one another, in particular, wherein the basic body of the indicator cap comprises an internal hexagonal recess while the pin comprises a coupling section having an external hexagonal cross section. The proposed means of attaching the indicator cap to the pin have been found to be beneficial in terms of saving installation space while at the same time providing a reliable and uniform operation of the pin actuator.

In a preferred embodiment, the motion distance of the pin in the first direction is limited to 3-7 mm, preferably 5 mm. Especially a motion distance of 5 mm has been found to provide a reasonable compromise between the capability to determine the state of the brake release mechanism on the one hand and the compactness of the device on the other hand.

It is furthermore preferred that the pin is located at an operating area of the brake release bolt being accessible and/or visible from outside a housing of the actuator. This helps to ensure that an operator is able to conveniently determine the state of the brake release mechanism.

Moreover, it is preferred that the pin is at least partially retracted into the bolt when the running nut forces the indicator cap against a spring force of the spring element. In other words, this configuration leads to a design at which the pin is only visible when the release mechanism has left the driving state. Whenever the brake release mechanism is operated, the pin is at least partially visible.

In a further aspect, the invention relates to a spring brake actuator, in particular a parking or emergency spring brake actuator for use in a commercial vehicle, the actuator comprising an actuator housing having an actuator housing base, a spring brake actuator piston located in the actuator housing for applying a braking force, an actuator power spring located between the actuator housing base and the spring brake actuator piston, the actuator power spring being effective to push the spring brake actuator piston away from the base and a brake release mechanism according to the embodiments described above.

The spring brake actuator takes advantage of the same benefits and preferred embodiments as the brake release mechanism according to the invention. In this regard, reference is made to the above explanations and their content is included herein.

The aspects of the disclosure may be best understood from the following detailed description taken in conjunction with the accompanying figures. The Figures are schematic and simplified for clarity, and they just show details to improve the understanding of the claims while other details are left out. Throughout, the same reference numerals are used for identical or corresponding parts. The individual features of each aspect may each be combined with any or all features of other aspects.

These and other aspects, features and/or technical effects will be apparent from and elucidated with reference to the illustrations described hereafter.

DETAILED DESCRIPTION OF THE DRAWINGS

Figure 1:
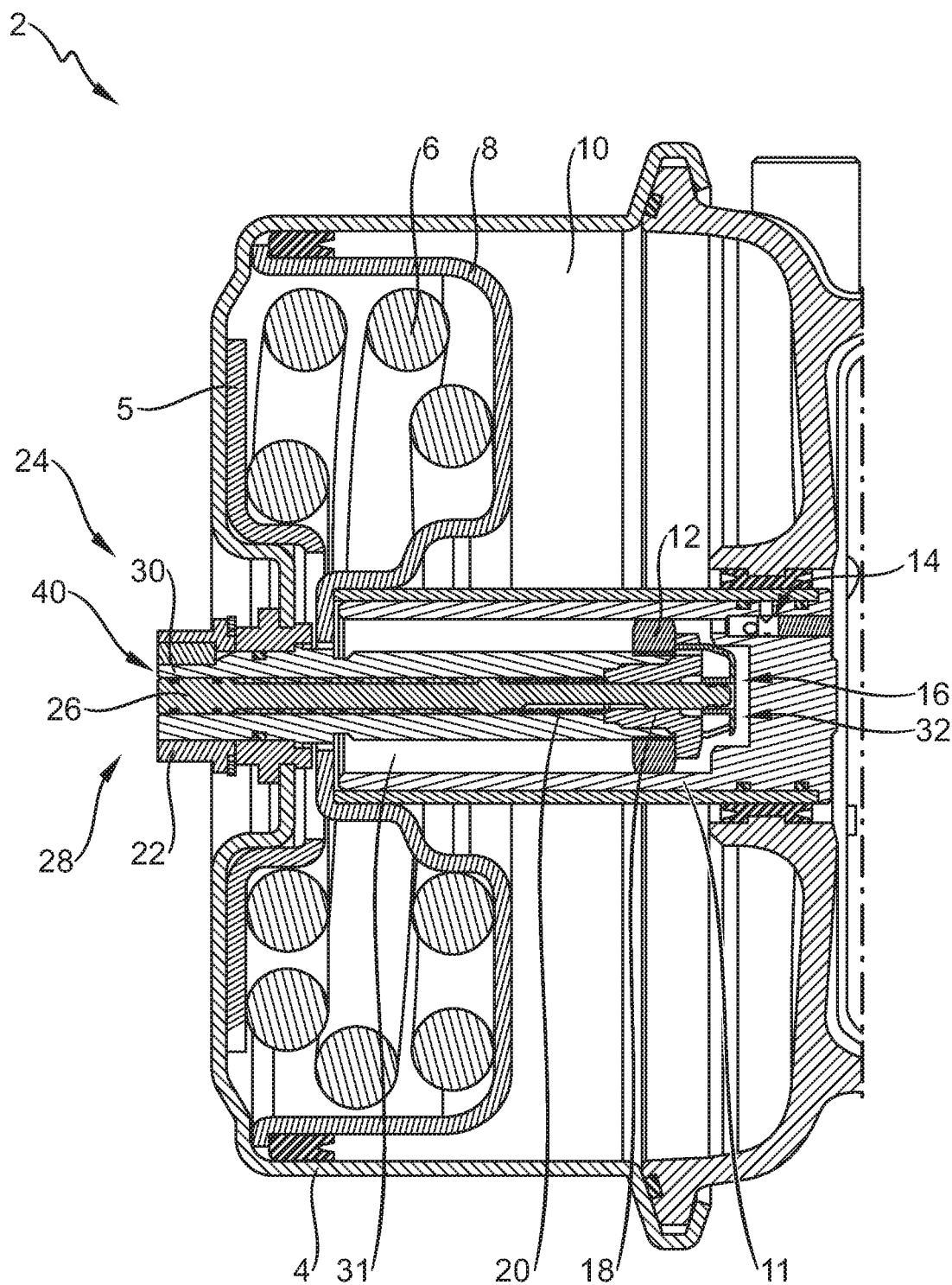
FIG. 1 shows a preferred embodiment of a spring brake actuator according to the concept of the invention in a sectional view.

FIG. 1 shows a spring brake actuator 2 having an actuator housing 4. Inside the actuator housing 4, an actuator power spring 6 and a pressure chamber 10 are located. The power spring 6, which rests on the left side in FIG. 1 against an actuator housing base 5 and on the opposing side on a spring brake actuator piston 8, is in FIG. 1 held in the release position by positive pressure inside the pressure chamber 10.

The spring brake actuator piston 8 is adapted to transmit the inflicted force to a rod 11 which in turn transmits the applied power to the wheel brakes (not shown).

Furthermore, the spring brake actuator 2 comprises a brake release mechanism 24. The brake release mechanism 24 is utilized to release the spring brake actuator 2. The brake release mechanism 24 comprises a brake release bolt 30 which is rotatably arranged within a release bolt housing 31. The brake release bolt 30 comprises a threaded portion 34 on which a running nut 12 is engaged. The release bolt housing 31 inhibits a rotatability of the running nut 12.

When the brake release bolt 30 is rotated via an external nut 22 located in an operating area 28, the running nut 12 moves along the threaded portion 34 and thus axially along the brake release bolt 30. The running nut 12 is adapted to move the spring brake actuator piston 8 against a force of the actuator power spring 6. In other words, when the running nut 12 moves toward the actuator housing base 5, it forces the spring brake actuator piston 8 toward the actuator housing base 5, thereby compressing the actuator power spring 6. This, in consequence, releases the spring brake actuator 2.

The brake release mechanism 24 furthermore comprises an indicator device 32. The indicator device 32 comprises an indicator pin 26 which is accommodated in a receiving space 40 of the release bolt 30. The indicator pin 26 is capable of moving within the receiving space 40 relative to the brake release bolt 30.

The indicator device 32 comprises a pin actuator 16 which will be described based on FIGS. 2 and 3 subsequently. The brake release mechanism 24 furthermore comprises a locking piece 18 and a spring element 20, the function of which will also be described with reference to FIGS. 2 and 3. Moreover the spring brake actuator 2 comprises an internal breathing valve 14 to transfer air from a service brake (not shown) to the actuator housing 4.

Figure 2:
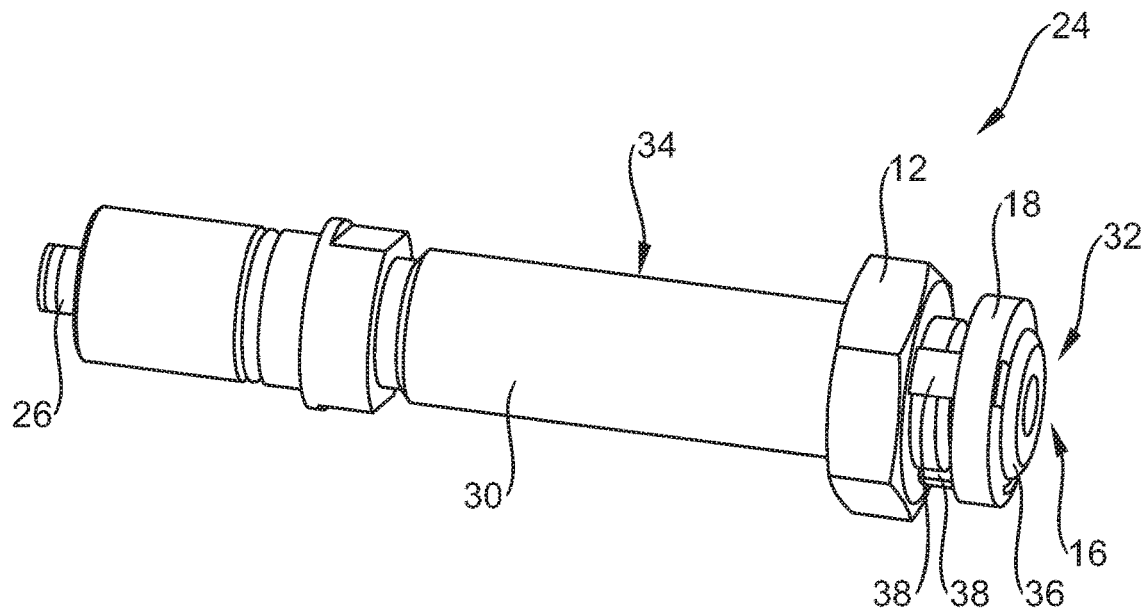
FIG. 2 shows a brake release mechanism for a spring brake actuator according to the preferred embodiment in a perspective view.

FIG. 2 shows the brake release mechanism 24 having a brake release bolt 30. The brake release bolt 30 comprises the threaded portion 34 on which the running nut 12 is able to move axially along the brake release bolt 30. The running nut 12 abuts against spacing elements 38 of an indicator cap 36. The indicator cap 36 is attached to the indicator pin 26. When the running nut 12 is moved toward the locking piece 18 and approaches the locking piece 18, the running nut 12 applies a force upon the spacing elements 38 of the indicator cap 36 thereby moving the indicator cap 36 to the right side in FIG. 2. As the indicator pin 26 is attached to the indicator cap 36, the indicator pin 26 is also moved to the right side.

Figure 3:
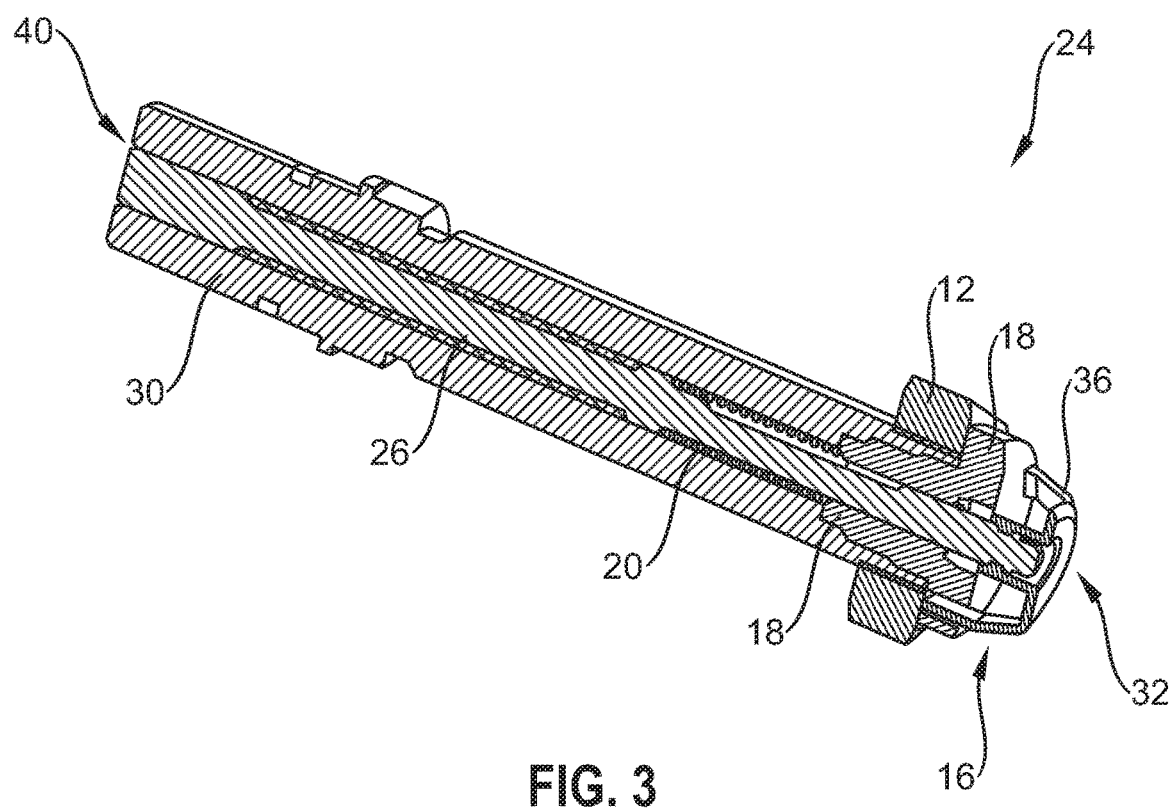
FIG. 3 shows the brake release mechanism according to FIG. 2 in a sectional view.

FIG. 3 shows a sectional view of the brake release mechanism 24. In FIG. 3, the brake release mechanism 24 is in a driving state at which the running nut 12 abuts against the locking piece 18. In this state, the running nut 12 does not compress the actuator power spring 6. The running nut 12 pushes the indicator cap 36 against a spring force of the spring element 20 toward the right side in FIG. 3. This retracts the indicator pin 26 into the receiving space 40 of the release bolt 30.

Figure 4:
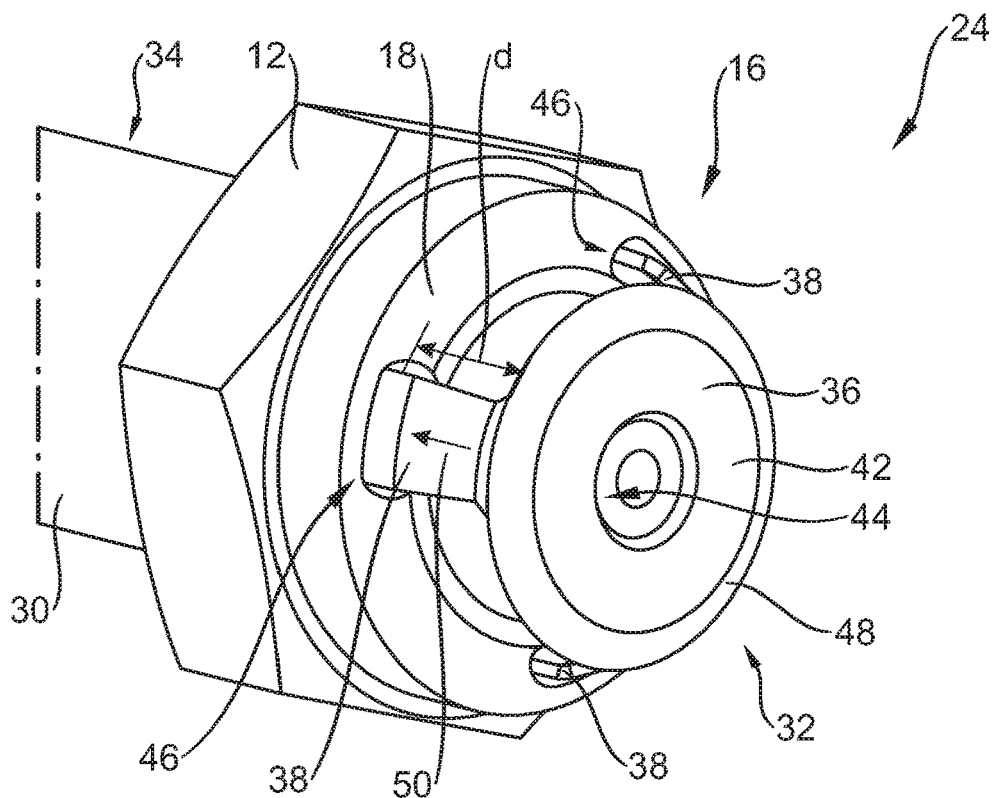
FIGS. 4, 5, and 6 show detailed perspectives of the brake release mechanism according to FIG. 2.

FIG. 4 shows a detailed perspective of the brake release mechanism 24 focusing on the indicator device 32. The locking piece 18 comprises apertures 46 which accommodate and guide the spacing elements 38. The indicator cap 36 comprises a basic body 42, wherein the spacing elements 38 are attached to the basic body 42 and are equally spaced around a circumference 48 of the basic body 42. Furthermore, the locking piece 18 comprises guiding means 44, here shown as a central bore which guides the indicator cap 36. The indicator cap 36 is configured to abut against the locking piece 18 to limit a motion distance d of the pin 26 in a first direction 50.

Figure 5:
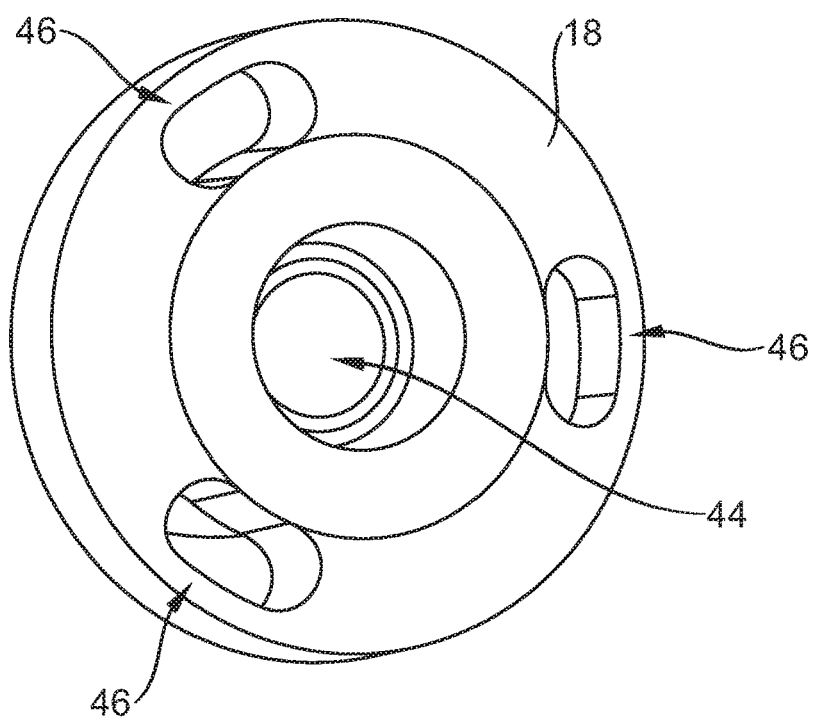

FIG. 5 shows a detailed perspective of the locking piece 18. The locking piece 18 comprises three apertures 46, the size of which corresponds to the dimensions of the spacing elements 38 (see FIG. 4). The apertures 46 are equally spaced. The locking piece 18 furthermore comprises guiding means 44 shown as a stepped central bore to help guide the indicator cap 36 and the indicator pin 26.

Figure 6:
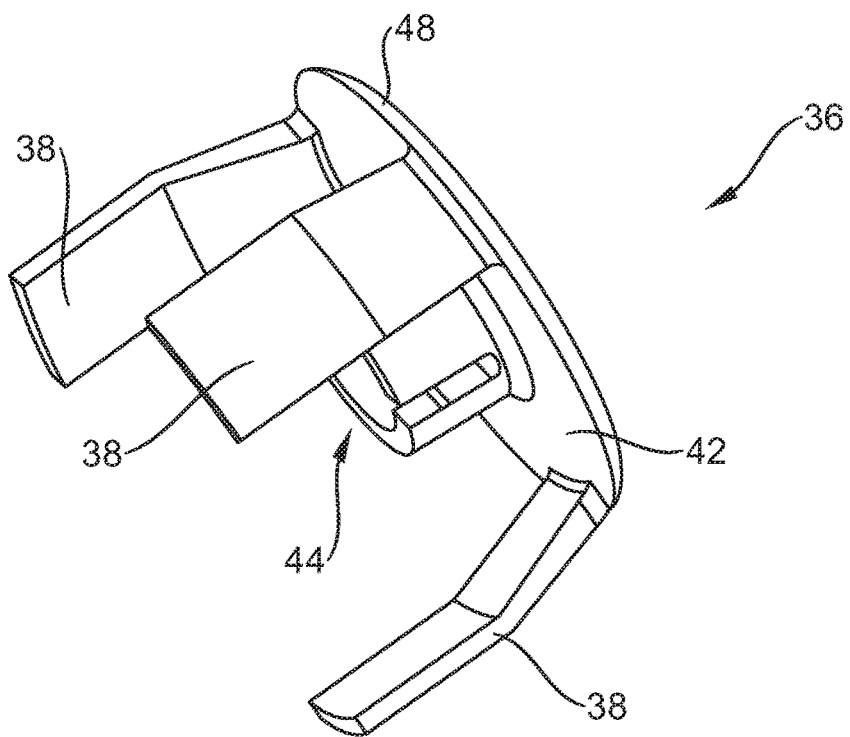

FIG. 6 shows a detailed perspective of the indicator cap 36. The indicator cap 36 comprises three spacing elements 38 that are attached to the basic body 42 of the indicator cap 36. The spacing elements 38 are equally spaced around the circumference 48 of the basic body 42. The indicator cap 36 moreover comprises guiding means 44 in the form of axial protrusions to guide the indicator cap 36 relative to the locking piece 18.

Figure 7:
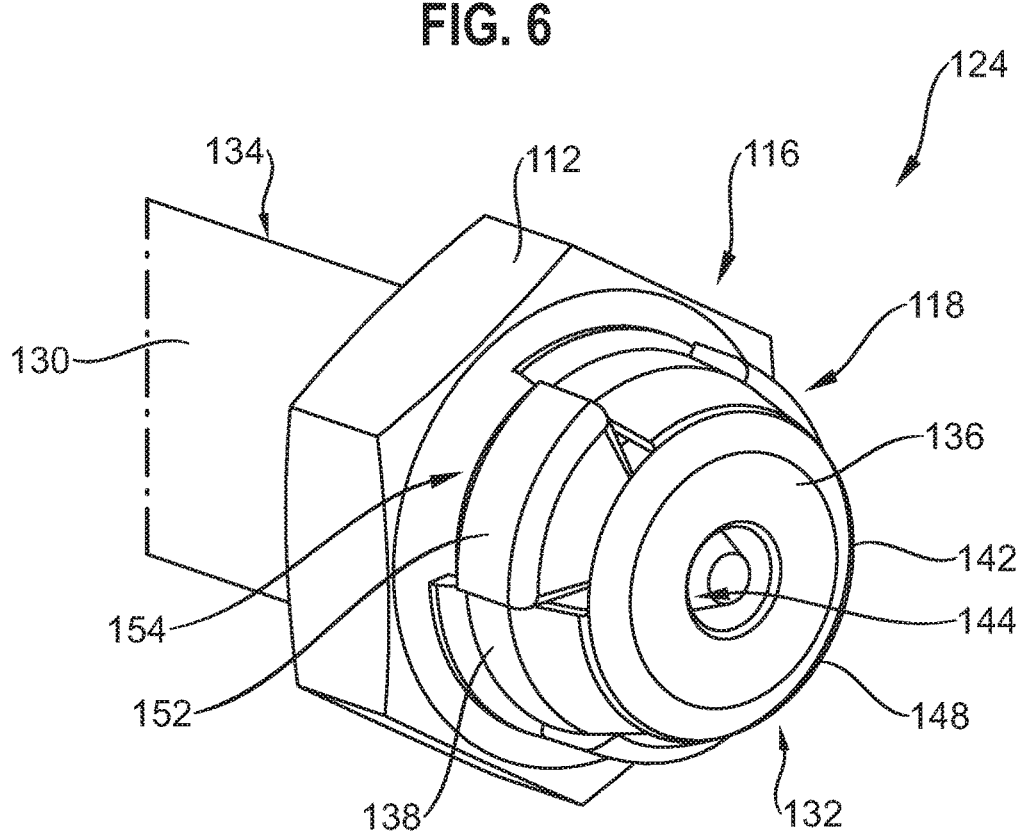
FIG. 7 shows an alternative embodiment of a brake release mechanism according to the concept of the invention in a perspective view.

FIG. 7 shows an alternative embodiment of a brake release mechanism 124. Similar to the first embodiment shown in FIGS. 1 to 6, the brake release mechanism 124 comprises a brake release bolt 130 having a threaded portion 134. A running nut 112 engages the threaded portion 134. The brake release mechanism 124 moreover comprises an indicator device 132 having a pin actuator 116. The pin actuator 116 comprises a locking piece 118 and an indicator cap 136. The indicator cap 136 comprises a basic body 142 as well as spacing elements 138 which are attached to the basic body 142 and are equally spaced along a circumference 148 of the basic body 142. As in the previous embodiment, the indicator cap 136 also comprises guiding means 144 for guiding the indicator cap 136 relative to the locking piece 118. The locking piece 118 comprises centering protrusions 152, which extend into gaps 154 between the spacing elements 138 at least partially, for guiding and centering the indicator cap 136.

Figure 8:
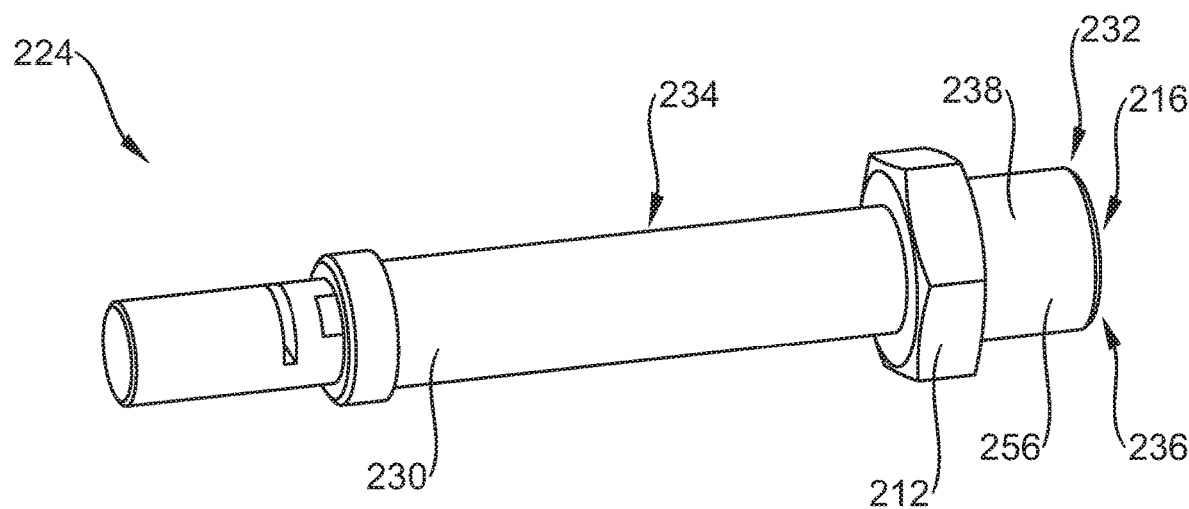
FIG. 8 shows another alternative embodiment of a brake release mechanism according to the concept of the invention in a perspective view.
Figure 9:
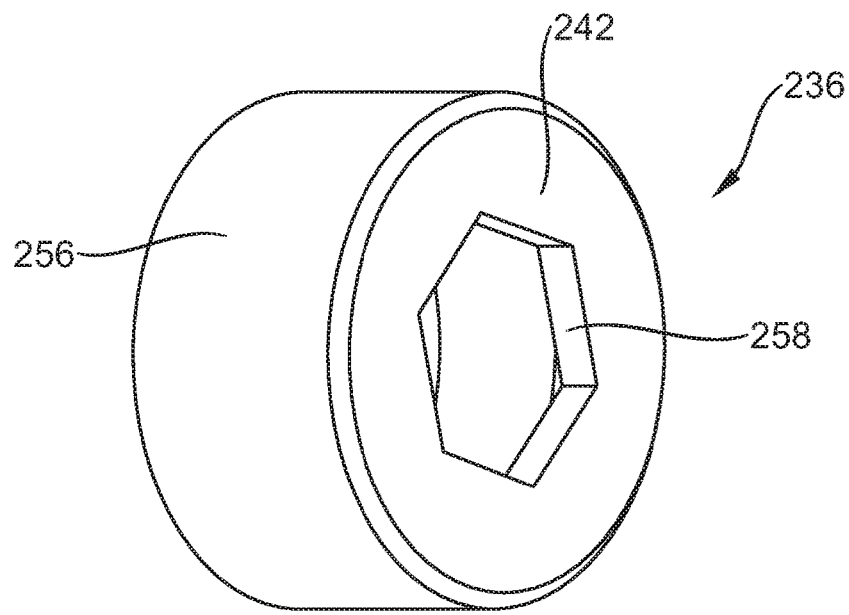
FIG. 9 shows an indicator cap in a perspective view according to the embodiment of a brake release mechanism of FIG. 8.
Figure 10:
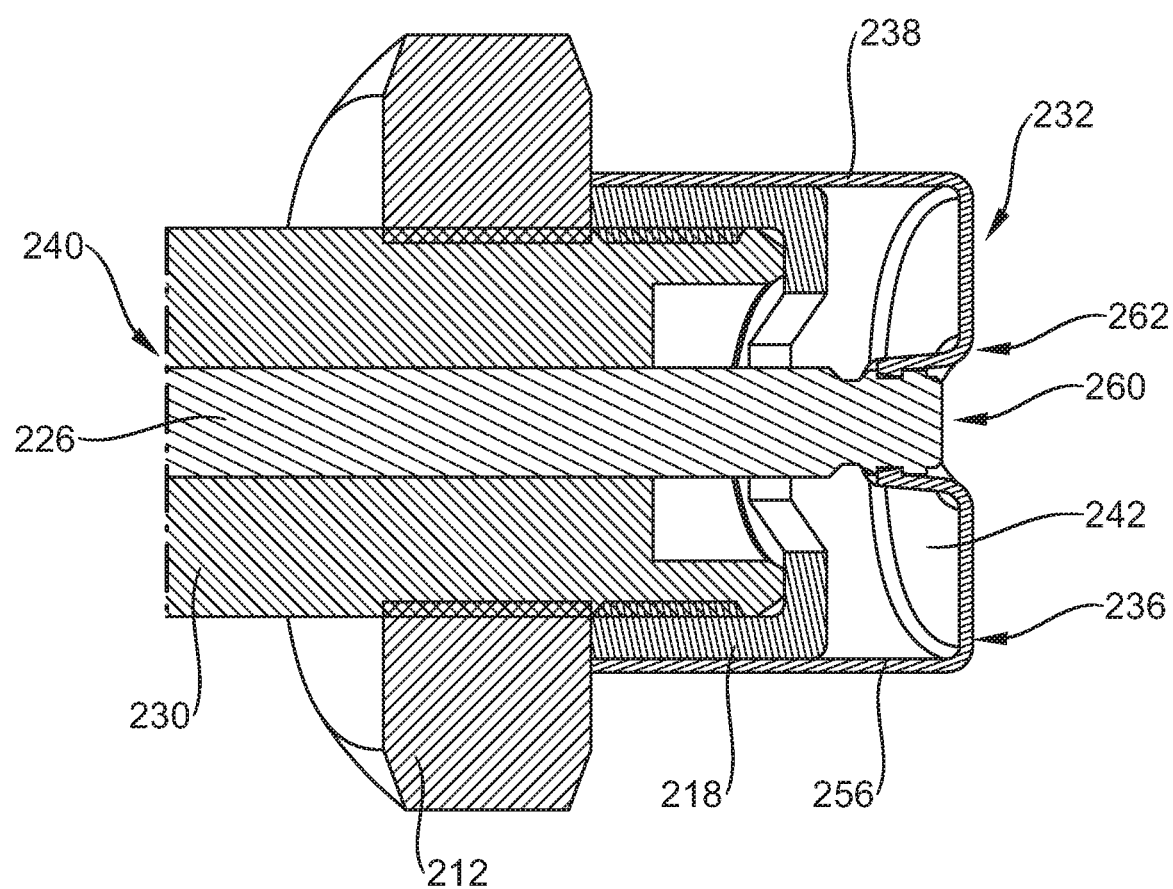
FIG. 10 shows a sectional view showing details of the embodiment of the brake release mechanism according to FIG. 8.

FIGS. 8, 9 and 10 illustrate a third embodiment of a brake release mechanism 224. The brake release mechanism 224 comprises a brake release bolt 230 having a threaded portion 234. A running nut 212 engages the threaded portion 234. The brake release mechanism 224 moreover comprises an indicator device 232 having a pin actuator 216 to actuate an indicator pin 226. The pin actuator 216 comprises an indicator cap 236 comprising a spacing element 238. The spacing element 238 is formed as a sleeve 256.

The indicator cap 236 is shown in detail in FIG. 9. The indicator cap 236 comprises a basic body 242 and a spacing element 238 which is formed as a sleeve 256. The sleeve 256 is attached to the basic body 242. Furthermore, the basic body 242 comprises an internal hexagonal recess 258. With the help of this internal hexagonal recess 258, the indicator cap 236 is attachable to the indictor pin 226 as illustrated in FIG. 10.

As illustrated in FIG. 10, the indicator pin 226 comprises a pin coupling section 260 having an external hexagonal cross section 262. This external hexagonal cross section 262 fits into the internal hexagonal recess 258 for press-fittingly connecting the indicator cap 236 to indicator pin 226. Similar to the first and second embodiment, the spacing element 238, which is formed as sleeve 256, abuts against running the nut 212 when the running nut 212 approaches a locking piece 218. The running nut 212 forces the basic body 242 of the indicator cap 236 away from the locking piece 218, thereby retracting indicator pin 226 into a receiving space 240 of the brake release bolt 230. This indicates that the brake release mechanism 224 is in a driving state.

While the above description constitutes the preferred embodiments of the present invention, the invention is susceptible to modification, variation and change without departing from the proper scope and fair meaning of the accompanying claims.

List of References (Part of the Description)
2 spring brake actuator
4 actuator housing
5 actuator housing base
6 actuator power spring
8 spring brake actuator piston
10 pressure chamber
11 rod
12 running nut
14 internal breathing valve
16 pin actuator
18 locking piece
20 spring element
22 external nut
24 brake release mechanism
26 indicator pin
28 operating area of brake release bolt
30 brake release bolt
31 release bolt housing
32 indicator device
34 threaded portion
36 indicator cap
38 spacing element
40 receiving space of the release bolt
42 basic body
44 guiding means
46 apertures
48 circumference of the basic body
50 first direction d motion distance of the pin 112 running nut
116 pin actuator
118 locking piece
124 brake release mechanism
130 brake release bolt
132 indicator device
134 threaded portion
136 indicator cap
138 spacing element
142 basic body
144 guiding means
148 circumference of the basic body
152 centering protrusions
154 gaps between the spacing elements
212 running nut
216 pin actuator
218 locking piece
224 brake release mechanism
226 indicator pin
230 brake release bolt
232 indicator device
234 threaded portion
236 indicator cap
238 spacing element
240 receiving space of the release bolt
242 basic body
256 sleeve
258 internal hexagonal recess
260 pin coupling section
262 external hexagonal cross section

What is claimed is:

1. A brake release mechanism (24, 124, 224) for a spring brake actuator (2), in particular a parking or emergency spring brake actuator (2) for use in a commercial vehicle, the brake release mechanism (24, 124, 224) comprising:
a brake release bolt (30, 130, 230) having a threaded portion (34, 134, 234),
a running nut (12, 112, 212) engaging the threaded portion (34, 134, 234), the running nut (12, 112, 212) being adapted to axially travel along the threaded portion (34, 134, 234) in order to move a spring brake actuator piston (8) against a force of an actuator power spring (6),
an indicator device (32, 132, 232) having an indicator pin (26, 226) at least partially accommodated in a receiving space (40) of the release bolt (30, 130, 230),
wherein the indicator device (32, 132, 232) includes a pin actuator (16, 116, 216) for axially moving the indicator pin (26, 226) relative to the receiving space (40), wherein the pin actuator (16, 116, 216) includes an indicator cap (36, 136, 236) attached to the indicator pin (26, 226), the indicator cap (36, 136, 236) having a basic body (42, 142, 242) and at least one spacing element (38, 138, 238) attached to the basic body (42, 142, 242), the at least one spacing element being (38, 138, 238) abutting the running nut (12, 112, 212); and
wherein the at least one spacing element is at least two and at most seven spacing elements (38, 138).

2. The release mechanism (24, 124) according to claim 1, wherein the spacing elements (38, 138) are equally spaced around the circumference of the basic body (42, 142).

3. The release mechanism (24, 124, 224) according to claim 1, wherein the brake release bolt (30, 130, 230) comprises a spring element (20) biasing the indicator pin (26, 226) in a first direction (50), and a locking piece (18, 118, 218) attached to the release bolt (30, 130, 230), the pin actuator (16, 116, 216) being configured to abut against the locking piece (18, 118, 218) to limit a motion distance (d) of the indicator pin (26, 226) in the first direction (50).

4. The release mechanism (24, 124, 224) according to claim 3, wherein the motion distance (d) of the pin (26, 226) in the first direction (50) is limited to at least 3 mm and at most 7 mm.

5. The release mechanism (24, 124) according to claim 3, wherein at least one of the basic body (42, 142) and the locking piece (18, 118) comprises guiding means (44, 144) to guide the indicator cap (36, 136) relative to the locking piece (18, 118) in at least one of an axial or radial direction.

6. The release mechanism (124) according to claim 1, wherein a locking piece (118) attached to the release bolt comprises centering protrusions (152) configured to extend into gaps (154) between the at least one spacing element (138), for guiding and centering the indicator cap (136).

7. The release mechanism according to claim 6, wherein the brake release bolt (30, 130, 230) comprises a spring element (20) biasing the indicator pin (26, 226) in a first direction (50), the pin actuator (16, 116, 216) being configured to abut against the locking piece (18, 118, 218) to limit a motion distance (d) of the indicator pin (26, 226) in the first direction (50).

8. The release mechanism (224) according to claim 1, wherein the at least one spacing element (238) is formed as a sleeve (256).

9. The release mechanism (224) according to claim 1, wherein the indicator pin (226) and the indicator cap (236) are press-fittingly attached to one another.

10. The release mechanism (224) according to claim 9, wherein the basic body (242) of the indicator cap (236) comprises an internal hexagonal recess (258) while the pin (226) comprises a coupling section having an external hexagonal cross section (262).

11. The release mechanism (24, 124, 224) according to claim 1, wherein the indicator pin (26, 226) is located at an operating area (28) of the brake release bolt (30) being accessible or visible from outside a housing (4) of the actuator (2).

12. The release mechanism (24) according to claim 1, wherein the indicator pin (26) is at least partially retracted into the brake release bolt (30) when the running nut (12) forces the indicator cap (36) against a spring force of the spring element (20).

13. A spring brake actuator (2) comprising:
a brake release mechanism according to claim 1,
an actuator housing (4) having an actuator housing base (5),
a spring brake actuator piston (8) located in the actuator housing (4) for applying a braking force, and
an actuator power spring (6) located between the actuator housing base (5) and the spring brake actuator piston (8), the actuator power spring (8) being effective to push the spring brake actuator piston (8) away from the actuator housing base (5).

14. The release mechanism according to claim 1, wherein a locking piece is attached to the release bolt, wherein the locking piece (18) comprises at least one aperture (46) for accommodating and guiding the at least one spacing element (38) of the indicator cap (36).

15. A brake release mechanism (24, 124, 224) for a spring brake actuator (2), in particular a parking or emergency spring brake actuator (2) for use in a commercial vehicle, the brake release mechanism (24, 124, 224) comprising:
a brake release bolt (30, 130, 230) having a threaded portion (34, 134, 234), a running nut (12, 112, 212) engaging the threaded portion (34, 134, 234), the running nut (12, 112, 212) being adapted to axially travel along the threaded portion (34, 134, 234) in order to move a spring brake actuator piston (8) against a force of an actuator power spring (6), an indicator device (32, 132, 232) having an indicator pin (26, 226) at least partially accommodated in a receiving space (40) of the release bolt (30, 130, 230), wherein the indicator device (32, 132, 232) includes a pin actuator (16, 116, 216) for axially moving the indicator pin (26, 226) relative to the receiving space (40), wherein the pin actuator (16, 116, 216) includes an indicator cap (36, 136, 236) attached to the indicator pin (26, 226), the indicator cap (36, 136, 236) having a basic body (42, 142, 242) and at least one spacing element (38, 138, 238) attached to the basic body (42, 142, 242), the at least one spacing element being (38, 138, 238) abutting the running nut (12, 112, 212);

wherein the brake release bolt (30, 130, 230) comprises a spring element (20) biasing the indicator pin (26, 226) in a first direction (50), and a locking piece (18, 118, 218) attached to the release bolt (30, 130, 230), the pin actuator (16, 116, 216) being configured to abut against the locking piece (18, 118, 218) to limit a motion distance (d) of the indicator pin (26, 226) in the first direction (50); and wherein the locking piece (18) comprises at least one aperture (46) for accommodating and guiding the at least one spacing element (38) of the indicator cap (36).

16. The release mechanism according to claim 15, wherein the at least one spacing element is at least two spacing elements (38, 138).

17. The release mechanism (124) according to claim 15, wherein the locking piece (118) comprises centering protrusions (152) configured to extend into gaps (154) between the at least one spacing element (138), for guiding and centering the indicator cap (136).

18. A brake release mechanism (24, 124, 224) for a spring brake actuator (2), in particular a parking or emergency spring brake actuator (2) for use in a commercial vehicle, the brake release mechanism (24, 124, 224) comprising:

a brake release bolt (30, 130, 230) having a threaded portion (34, 134, 234), a running nut (12, 112, 212) engaging the threaded portion (34, 134, 234), the running nut (12, 112, 212) being adapted to axially travel along the threaded portion (34, 134, 234) in order to move a spring brake actuator piston (8) against a force of an actuator power spring (6), an indicator device (32, 132, 232) having an indicator pin (26, 226) at least partially accommodated in a receiving space (40) of the release bolt (30, 130, 230), wherein the indicator device (32, 132, 232) includes a pin actuator (16, 116, 216) for axially moving the indicator pin (26, 226) relative to the receiving space (40), wherein the pin actuator (16, 116, 216) includes an indicator cap (36, 136, 236) attached to the indicator pin (26, 226), the indicator cap (36, 136, 236) having a basic body (42, 142, 242) and at least one spacing element (38, 138, 238) attached to the basic body (42, 142, 242), the at least one spacing element being (38, 138, 238) abutting the running nut (12, 112, 212);

wherein a locking piece (18, 118, 218) is attached to the release bolt (30, 130, 230), the locking piece (18) comprising at least one aperture (46) for accommodating and guiding the at least one spacing element (38) of the indicator cap (36).

19. The release mechanism according to claim 18, wherein the at least one spacing element is at least two spacing elements (38, 138).

20. The release mechanism according to claim 18, wherein the locking piece (118) comprises centering protrusions (152) configured to extend into gaps (154) between the at least one spacing element (138), for guiding and centering the indicator cap (136).

* * * * *